(12) United States Patent
Wolfe

(10) Patent No.: US 11,968,977 B2
(45) Date of Patent: Apr. 30, 2024

(54) WEED CONTROL AND FERTILIZER

(71) Applicant: One Earth Organics, LLC, Boulder, CO (US)

(72) Inventor: Bradley T. Wolfe, Boulder, CO (US)

(73) Assignee: One Earth Organics, LLC, Boulder, CO (US)

( * ) Notice: Subject to any disclaimer, the term of this patent is extended or adjusted under 35 U.S.C. 154(b) by 0 days.

(21) Appl. No.: 17/739,667

(22) Filed: May 9, 2022

(65) Prior Publication Data

US 2022/0369634 A1   Nov. 24, 2022

Related U.S. Application Data

(60) Division of application No. 16/725,338, filed on Dec. 23, 2019, now Pat. No. 11,324,218, which is a continuation-in-part of application No. 15/718,324, filed on Sep. 28, 2017, now Pat. No. 11,078,128, which is a continuation-in-part of application No. 15/085,061, filed on Mar. 30, 2016, now Pat. No. 9,955,697.

(51) Int. Cl.
| | | |
|---|---|---|
| A01N 37/44 | (2006.01) | |
| A01N 31/02 | (2006.01) | |
| A01N 61/00 | (2006.01) | |
| A01N 65/20 | (2009.01) | |
| C05F 5/00 | (2006.01) | |
| C05F 11/02 | (2006.01) | |
| C05G 3/60 | (2020.01) | |

(52) U.S. Cl.
CPC ............. *A01N 37/44* (2013.01); *A01N 31/02* (2013.01); *A01N 61/00* (2013.01); *A01N 65/20* (2013.01); *C05F 5/00* (2013.01); *C05F 11/02* (2013.01); *C05G 3/60* (2020.02)

(58) Field of Classification Search
None
See application file for complete search history.

(56) References Cited

U.S. PATENT DOCUMENTS

| | | | |
|---|---|---|---|
| 4,519,845 A | 5/1985 | Ou | |
| 5,290,749 A * | 3/1994 | Christians | A01N 37/46 504/335 |
| 6,241,795 B1 | 6/2001 | Svec et al. | |
| 6,271,177 B1 | 8/2001 | Hudetz | |
| 6,486,097 B2 | 11/2002 | Sedun et al. | |
| 6,972,273 B2 | 12/2005 | Sedun et al. | |
| 7,776,124 B2 | 8/2010 | Binder et al. | |
| 7,947,104 B2 | 5/2011 | Burnham et al. | |
| 8,076,267 B2 | 12/2011 | Diebold et al. | |
| 8,110,017 B2 | 2/2012 | Wells | |
| 8,557,013 B2 | 10/2013 | Burnham et al. | |
| 8,920,733 B2 | 12/2014 | Burnham et al. | |
| 8,987,171 B2 | 3/2015 | Samarajeewa et al. | |
| 8,992,654 B2 | 3/2015 | Dahms et al. | |
| 9,955,697 B2 | 5/2018 | Wolfe | |
| 11,078,128 B2 | 8/2021 | Wolfe | |
| 11,324,218 B2 | 5/2022 | Wolfe | |
| 2001/0042494 A1* | 11/2001 | Welshimer | B01J 20/2803 106/464 |
| 2006/0084575 A1 | 4/2006 | Sedun et al. | |
| 2007/0173409 A1 | 7/2007 | Freire et al. | |
| 2009/0004167 A1 | 1/2009 | Boulos et al. | |
| 2009/0229331 A1 | 9/2009 | Wells | |
| 2010/0154498 A1 | 6/2010 | Valencia | |
| 2010/0273656 A1 | 10/2010 | Sedun et al. | |
| 2011/0154873 A1 | 6/2011 | Burnham et al. | |
| 2011/0265532 A1 | 11/2011 | Burnham et al. | |
| 2012/0010078 A1 | 1/2012 | Garcia-Mina et al. | |
| 2012/0090365 A1 | 4/2012 | Ersek et al. | |
| 2012/0247164 A1 | 10/2012 | Dahms et al. | |
| 2013/0160506 A1* | 6/2013 | Lynch | C05F 11/00 71/25 |
| 2014/0137614 A1 | 5/2014 | Burnham et al. | |
| 2015/0080216 A1* | 3/2015 | Wikeley | C05G 3/00 504/136 |

(Continued)

FOREIGN PATENT DOCUMENTS

| | | |
|---|---|---|
| CA | 2926037 A1 | 9/2017 |
| RU | 2177466 C2 * | 12/2001 |

(Continued)

OTHER PUBLICATIONS

Weed & Feed (https://www.oneprojectcloser.com/when-and-how-to-apply-weed-feed/), no pagination (Year: 2011).*
Novasep (https://web.archive.org/web/20150703182407/https://www.novasep.com/home/products-services/food-ingredients/industrial-processes/saccharose-production-from-sugar-beet.html) no pagination (Year: 2015).*
Jian et al. (Agri. Sci. in China, 2010, 9(6), 854-860) (Year: 2010).*
https://www.neudorffpro.org/_content/resources/Fiesta-HealthCanada.pdf, FeHEDTA, 2010. p. 1-45.*
Advisory Action in U.S. Appl. No. 16/725,338 dated Feb. 22, 2022, 5 pages.
Advisory action and interview summary dated Dec. 4, 2017 for U.S. Appl. No. 15/085,061, 6 pages.

(Continued)

*Primary Examiner* — Erin E Hirt
(74) *Attorney, Agent, or Firm* — Cooley LLP

(57) ABSTRACT

A composition for weed control and fertilizer comprising iron hydroxyl ethylenediaminetriacetic acid, humate, microelements, soy hydrolysate, calcium lignin, a natural-based wetting agent, molasses desurgarized solubles, and water, and may further comprise glycerin and/or preservatives, are provided. Methods for weed control and fertilization of plants comprising the steps of providing a composition comprising an effective amount of iron hydroxyl ethylenediaminetriacetic acid, humate, microelements, soy hydrolysate, calcium lignin, a natural-based wetting agent, and molasses desurgarized solubles, and applying an effective amount of the composition to soil or a plant or a weed, are also provided.

16 Claims, 19 Drawing Sheets

(56) References Cited

U.S. PATENT DOCUMENTS

| | | | |
|---|---|---|---|
| 2015/0101374 A1 | 4/2015 | Burnham et al. | |
| 2015/0191399 A1 | 7/2015 | Dahms et al. | |
| 2016/0157493 A1* | 6/2016 | Sedun | A01N 37/44 504/190 |
| 2017/0280723 A1 | 10/2017 | Wolfe | |
| 2018/0016198 A1 | 1/2018 | Wolfe | |
| 2019/0124928 A1 | 5/2019 | Arndt et al. | |
| 2019/0191699 A1 | 6/2019 | Arachchige et al. | |
| 2020/0128824 A1 | 4/2020 | Wolfe | |

FOREIGN PATENT DOCUMENTS

| | | | | |
|---|---|---|---|---|
| WO | WO-2017197066 A1 * | 11/2017 | | A01N 25/06 |
| WO | WO-2018035530 A1 * | 2/2018 | | C02F 3/02 |

OTHER PUBLICATIONS

Agriinfotech "super-humate" http://www.agriinfotech.com/htmls/PDF-Files/Super-Humate%20Technical%20Information.pdf, cached wayback machine Oct. 23, 2006, no pagination, 3 pages. (Year: 2006).

Alexandrova and Jorgensen, "Why urea eliminates ammonia rather than hydrolyzes in aqueous solution". The Journal of Physical Chemistry B. (Feb. 1, 2007); 111(4): 720-730.

Andersons Products https://web.archive.org/web/20130521135300/https://andersonshumates.com/products/, cached wayback machine May 21, 2013, no pagination. (Year: 2013).

[Author Unknown] "Food Ingredients. Saccharose production from sugar beet", Novasep (https://web.archive.org/web/20150703182407/https://www.novasep.com/home/products-services/food-ingredients/industrial-processes/saccharose-production-from-sugar-beet.html), date unknown, 5 pages.

[Author Unknown] "What can Humates do for my crops?" AGSOL, Agriculture Solutions, Inc. © 2020, (https://www.agsolcanada.com/products/humates), no pagination no date, downloaded Jan. 2, 2021, https://www.agsolcanada.com/products/humates, 8 pages.

EPA "Scott's Lawn Pro Weed & Feed" https://www3.epa.gov/pesticides/chem_search/ppls/000538-00215-20070605.pdf, no pagination. (Year: 2007).

Final office action dated Sep. 12, 2017 and response filed Nov. 10, 2017 for U.S. Appl. No. 15/085,061, 24 pages.

Micromate (https://humates.com/micromate/, cached google 2010) (Year: 2010).

Neudorff product list [online] [retrieved on Mar. 3, 2020]. Retrieved from the Internet: URL: http:llwww.neudorffpro.com/index.php?id=1710.

Notice of Allowance in U.S. Appl. No. 15/718,324 dated May 14, 2021, 8 pages.

Office Action for U.S. Appl. No. 16/725,338 dated Nov. 17, 2021, 15 pages.

Office Action for U.S. Appl. No. 16/725,338 dated Jan. 25, 2021, 14 pages.

Office Action in corresponding Canadian Patent Application No. 2,926,037 dated Jan. 25, 2022, 4 pages.

Office Action in U.S. Appl. No. 15/718,324, dated Apr. 8, 2020, 18 pages.

Office Action in U.S. Appl. No. 15/718,324 dated Jan. 7, 2021, 26 pages.

Office Action in U.S. Appl. No. 15/718,324, dated Oct. 7, 2020, 25 pages.

Office Action dated Nov. 18, 2019 and response filed Jan. 9, 2020, for U.S. Appl. No. 15/718,324, 39 pages.

Office Action dated May 1, 2017 and response filed Jul. 25, 2017 for U.S. Appl. No. 15/085,061, 17 pages.

Pre-Appeal brief and request, and notice of appeal filed Jan. 12, 2018 and decision received Feb. 7, 2018, for U.S. Appl. No. 15/085,061, 9 pages.

Restriction Requirement in U.S. Appl. No. 15/718,324, dated Oct. 2, 2019, 6 pages.

Restriction requirement dated Nov. 22, 2016 and response filed Jan. 23, 2017 for U.S. Appl. No. 15/085,061, 11 pages.

Singleton, B., "What Does Lime Do for grass?" Newsletter, SFGATE, Dec. 6, 2018, no pagination https://homeguides.sfgate.com/lime-grass-57266.html (Year: 2018), 10 pages.

Wilen, C. "Preliminary Report on Iron HEDTA: A natural selective herbicide" UC Weed Science, 2012, no pagination (https://ucanr.edu/blogs/blogcore/postdetail.cfm?postnum=7046).

Yang, Jian and Lu, Chang-Yi, "Possible Mechanism Associated with Herbicidal Activity of Soybean Meal Hydrolysate (SMH)", Agricultural Sciences in China (Jun. 2010); 9(6): 854-860.

* cited by examiner

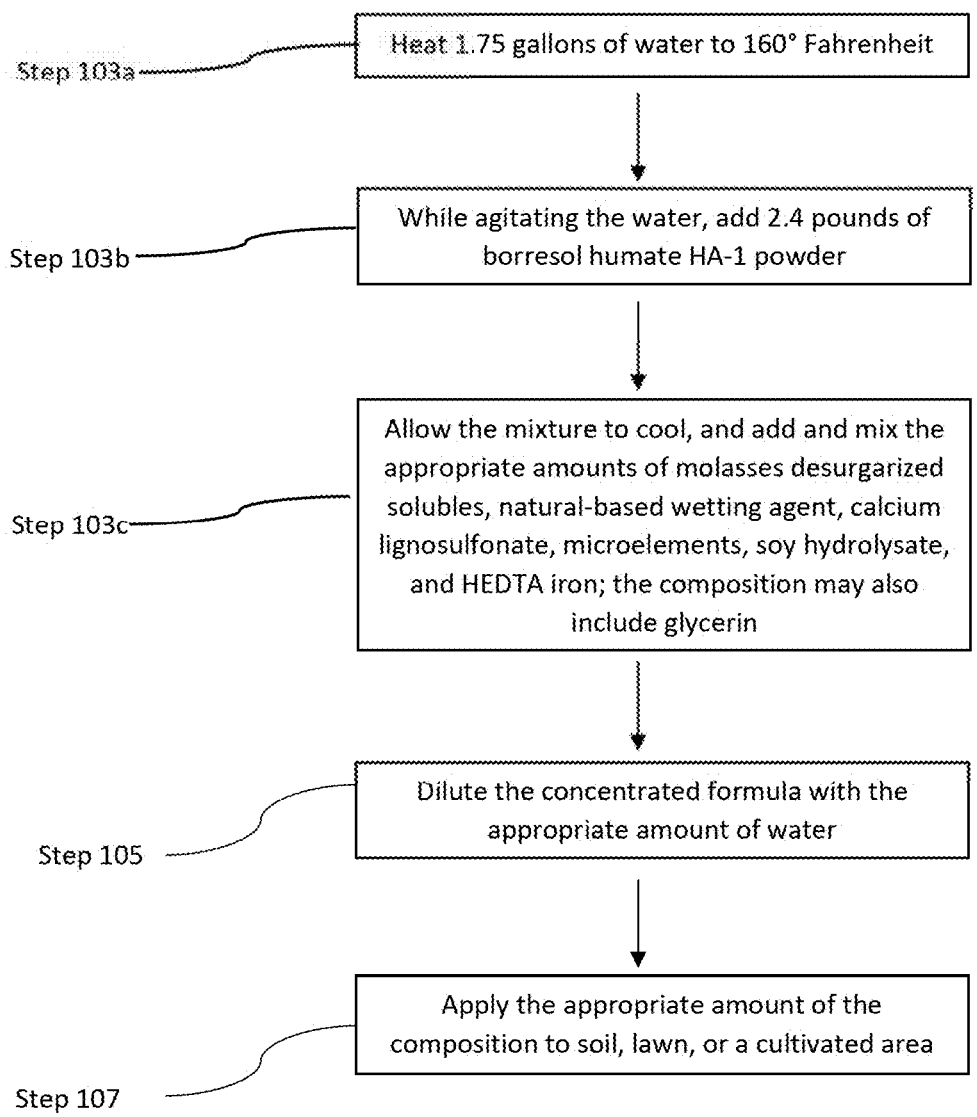

WEED CONTROL AND FERTILIZER

CROSS REFERENCE TO RELATED APPLICATIONS

This application is a Divisional of U.S. Non-Provisional patent application Ser. No. 16/725,338, filed on Dec. 23, 2019, now issued as U.S. Pat. No. 11,324,218, which is a Continuation-In-Part Patent Application claiming the benefit of priority from U.S. Non-Provisional patent application Ser. No. 15/718,324, filed on Sep. 28, 2017, now issued as U.S. Pat. No. 11,078,128, which is a Continuation-In-Part of and claims the benefit of priority from U.S. Non-Provisional patent application Ser. No. 15/085,061, filed on Mar. 30, 2016, now issued as U.S. Pat. No. 9,955,697, filed on Mar. 30, 2016, the contents of each of which are incorporated herein by reference in their entireties.

BACKGROUND

Soil contains many of the essential elements needed for plant growth. However, to achieve maximum growth and yield fertilizers and various forms of weed control are often employed to enrich the soil and supplement nutrients that are needed for optimum plant growth.

The foregoing examples of related art and limitations related therewith are intended to be illustrative and not exclusive, and they do not imply any limitations. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope.

An embodiment of the present disclosure may comprise a concentrated composition for weed control and fertilizer comprising: iron hydroxyl ethylenediaminetriacetic acid, at approximately between 46.74% and 51.69% of the total weight; humate, at approximately between 1.84% and 2.5% of the total weight; microelements, at approximately between 1.45% and 1.67% of the total weight; soy hydrolysate, at approximately between 1.88% and 2.5% of the total weight; a wetting agent, at approximately between 0.34% and 0.42% of the total weight; molasses desugarized solubles, at approximately between 39.17% and 42.01% of the total weight; and calcium lignin, at approximately between 3.24% and 3.58% of the total weight.

Another embodiment of the present disclosure may comprise a method for weed control and fertilization comprising the steps of: providing the concentrated composition comprising: iron hydroxyl ethylenediaminetriacetic acid, at approximately between 46.74% and 51.69% of the total weight; humate, at approximately between 1.84% and 2.5% of the total weight; microelements, at approximately between 1.45% and 1.67% of the total weight; soy hydrolysate, at approximately between 1.88% and 2.5% of the total weight; a wetting agent, at approximately between 0.34% and 0.42% of the total weight; molasses desugarized solubles, at approximately between 39.17% and 42.01% of the total weight; and calcium lignin, at approximately between 3.24% and 3.58% of the total weight; diluting said concentrated composition to between 11% and 16.5%; and applying an effective amount of the diluted composition to soil, lawn, or a cultivated area, wherein said effective amount is between 0.2 ounces and 0.4 ounces per square foot.

In addition to the examples, aspects and embodiments described above, further aspects and embodiments will become apparent by study of the following descriptions. The summary above is a list of example implementations, not a limiting statement of the scope.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the Patent Office upon request and payment of the necessary fee.

The accompanying figures, which are incorporated herein and form a part of the specification, illustrate some, but not the only or exclusive, example embodiments and/or features. It is intended that the embodiments and figures disclosed herein are to be considered illustrative rather than limiting.

FIG. 1 is a flow diagram of how to make and use the composition of the present disclosure.

DETAILED DESCRIPTION

Figure 2A:
FIG. 2A is a photograph of a broad leaf weed 1 minute after application of the formulation of the present disclosure.
Figure 2B:
FIG. 2B is a photograph of the broad leaf weed shown in FIG. 2A 15 hours and 2 minutes after application of the formulation of the present disclosure.
Figure 2C:
FIG. 2C is a photograph of the broad leaf weed shown in FIG. 2A 21 hours and 50 minutes after application of the formulation of the present disclosure.
Figure 2D:
FIG. 2D is a photograph of the broad leaf weed shown in FIG. 2A 25 hours and 26 minutes after application of the formulation of the present disclosure.
Figure 2E:
FIG. 2E is a photograph of the broad leaf weed shown in FIG. 2A 42 hours and 12 minutes after application of the formulation of the present disclosure.

Embodiments of the present disclosure provide formulations and methods for weed control and fertilizer. The formulations comprise various concentrations of iron hydroxyl ethylenediaminetriacetic acid (iron HEDTA), microelements, humate, soy hydrolysate, a natural-based wetting agent, molasses desurgarized solubles (MDS), calcium lignin, and water, and may also contain glycerin. The composition is thoroughly mixed together to form a solution that is then applied to soil, lawn, or a cultivated area in order to kill weeds and fertilize plants. The solution may be applied, for example, up to 8 times per year in tropical climates and those with mild winters or may be applied 6 to 8 weeks apart for example, in temperate climates. In the case of rain following treatment, the solution may be re-applied one week later to ensure adequate results. For difficult weeds, a second application may be applied 5 to 10 days after the initial application.

As will be understood by one skilled in the art, the formulation of the present disclosure may comprise various combinations, including but not limited to, iron HEDTA, microelements, humate, soy hydrolysate (nitrogen source), a natural-based wetting agent, MDS, calcium lignin, and water, and may further comprise glycerin and/or a preservative.

Table 1 below shows approximate percentage range of an example of the ingredients of an exemplary formulation as an embodiment of the present disclosure for the control of weeds and fertilization of plants. Column 1 shows a list of the ingredients of one or more embodiments of the composition of matter of the present disclosure. Column 2 shows the approximate percentage range of each ingredient of one or more embodiments of the present disclosure.

TABLE 1

| Ingredient | % Range in Concentrate formula |
| --- | --- |
| Core 4.5% Iron HEDTA (contains 26.7% Fe HEDTA) | 46.74% to 51.69% |
| Humate | 1.84% to 2.5% |
| Microelements | 1.45% to 1.67% |
| Soy hydrolysate (nitrogen source) | 1.88% to 2.5% |
| A natural-based wetting agent | 0.34% to 0.42% |
| MDS | 39.17% to 42.01% |
| Glycerin | 0.35% to 0.43% |
| Ca Lignin | 3.24% to 3.58% |

The application of the composition to soil, lawn, or a cultivated area in accordance with the teaching of the present disclosure kills unwanted plants or weeds as well as fertilizes plants. The composition of the present disclosure is a post emergent weed control and fertilizer made from food grade ingredients that will kill most broadleaf weeds (dicots). The ingredients in the composition of the present disclosure function as catalysts for oxygen reduction, which causes the production of unstable and highly reactive oxygen radicals, such as hydroxyl radicals. This causes cellular damage within the weed, leading to plant death. Dicots cannot handle the nutrient overload because they metabolize them too quickly causing them to die, typically within 36 to 72 hours. Weed control rates range from between 60% to 90% reduction per application depending on the weed species and time of year. Watering before the application of the composition and 12 to 24 hours afterwards can increase the effectiveness of the composition on weed control.

Additionally, compositions of the present disclosure will fertilize the lawn and build and stimulate beneficial microbial activity in soils. The compositions of the present disclosure are considered non-toxic to pets, dogs, cats, people, and the environment.

Weeds

For purposes of the present disclosure, the term "weed" means a plant growing where it is not wanted and/or in competition with a cultivated area. Application of the composition of the present disclosure may kill the following weeds, but is not limited to: bindweed, black medic, broadleaf plantain, bull thistle, Canada thistle, common chickweed, dandelion, false dandelion, lambs ear, mallow, narrow-leaved plantain, oxalis, Persian speedwell, prickly lettuce, prostrate spurge, purslane, redroot pigweed, slender speedwell, white clover, wild strawberry, and wild violet.

Table 2 below shows the weed and the approximate percent killed using the compositions of the present disclosure as shown in Table 1 by example. Column 1 lists the weed, column 2 shows the percentage of weeds killed, and column 3 shows the rating of weed control based on the percentage. The compositions of the present disclosure work very well on controlling dandelions and often the control rates are up to 90% or greater when lawns are treated in the spring.

TABLE 2

| Weed | Percent killed | Rating |
| --- | --- | --- |
| Bindweed | 60% to 80% | Good |
| Black medic | 60% to 80% | Good |
| Broadleaf plantain | 80% to 90% | Excellent* |
| Bull thistle | 80% to 90+% | Excellent |
| Canada thistle | 80% to 90+% | Excellent |
| Common Chickweed | 80% to 90% | Excellent* |
| Dandelion | 90+% | Very Excellent, especially in the spring |
| False dandelion | 80% to 90+% | Excellent |
| Lambs Ear | 25% to 50% | Moderate |
| Mallow | 80% to 90% | Excellent* |
| Narrow-leaved plantain | 80% to 90+% | Excellent* |
| Oxalis | 80% to 90% | Excellent* |
| Persian speedwell | 60% to 80% | Good |
| Prickly Lettuce | 80% to 90+% | Excellent |
| Prostrate Spurge | 80% to 90% | Excellent* |
| Purslane | 80% to 90% | Excellent* |
| Redroot Pigweed | 60% to 80% | Good |
| Slender speedwell | 60% to 80% | Good |
| White clover | 80% to 90% | Excellent* |
| Wild strawberry | 80% to 90% | Excellent* |
| Wild violet | 80% to 90% | Excellent* |

*with a second application 5-10 days later

Fertilization

For the purposes of the present disclosure, the term "fertilizer" means any material of natural or synthetic origin that is applied to soils or to plant tissues to supply one or more plant nutrients to the growth of plants.

Iron

In an embodiment of the present disclosure, a composition of matter for weed control and fertilization of plants is provided, where an aspect of the composition comprises iron. There is an iron hydroxyl ethylenediaminetriacetic acid (iron HEDTA) in the composition of the present disclosure, which can be purchased commercially, and it is a very strong chelating agent which means it is more available to the plant for uptake. Types of iron that may be bound to a chelating agent and used in the present disclosure include, but are not limited to, for example, ferric nitrate and iron chloride.

Descriptive examples of the concentration of iron HEDTA of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 46.74% and 51.69% and all integers in between. Therefore, while these descriptive examples have, for example, 50%, 51.69%, 46.74%, and 49.58%, it should be understood that these descriptions are applicable to any such concentration including but not limited to ranging between 46.74% and 51.69% and all integers in between, as will be understood by one skilled in the art, once they understand the principles of this disclosure. In some embodiments, the term "effective amount" of iron HEDTA may indicate an amount that is effective, when administered in a composition for weed control and plant fertilization as described herein.

Humate

Humate is composed of organic matter that is millions of years old, that resulted from the decomposition of prehistoric plant and animal matter. Because it was once a living organism, it has many of the properties available to provide plants what they need for rapid and healthy growth. Humate also holds minerals and macro nutrients in available and soluble forms that can be assimilated and used by plants. Still further, humate provides direct plant stimulation by supplying a slow release of auxin, amino acids and organic phosphate, thus regulating hormone levels that tend to undergo rapid changes in stressed plants. In addition, humate serves as a substrate supporting the growth and proliferation of beneficial soil micro-organisms.

Humates also provide a number of physical benefits including increased water holding capacity of soil, increased aeration of soil, improved soil workability, improved seed bed, reduced soil erosion, and improved drought tolerance. Chemical benefits are also provided which include an increased percentage of total nitrogen in the soil, neutralized alkaline and acidic soils, maximized ion exchange capacity, maximized mineral uptake, and retention and release of fertilizer in root zones as needed. Still further, biological benefits are provided and include accelerated cell division thus stimulating plant growth, increased cell wall thickness thus extending shelf life, accelerated seed germination, increase of desirable micro-organisms in soil, increased vitamin content in plants, increased length wise root growth, maximized nutrient uptake, increased plant enzyme production, and enhanced photosynthesis.

Humate is primarily comprised of organic carbon in the form of humic acid and fulvic acid, but may also conatin ulmic acid and lignin, as well as many trace elements such as copper (Cu), iron (Fe), and zinc (Zn). Humic acid is a naturally occurring dark brown or black substance found in association with fulvic acid. Fulvic acid is a naturally occurring yellow-brown product of microbial metabolism that can be extracted from sediment and is a powerful organic electrolyte.

Descriptive examples of the concentration of humate of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 1.84% and 2.5% and all integers in between. Therefore, while these descriptive examples have, for example, 2.5%, 2.04%, 1.84%, and 1.94%, it should be understood that these descriptions are applicable to any such concentration including but not limited to ranging between 1.84% and 2.5% and all integers in between, as will be understood by one skilled in the art. In some embodiments, the term "effective amount" of humate may indicate an amount that is effective, when administered in a composition for weed control and plant fertilization as described herein.

Microelements

Microelements is a chelated mix of micronutrients (commercially available, for example AXILO® Mix 5 or Agroplasma Microelements 1-0-0). The chelated mix of micronutrients may include, but is not limited to, for example, nitrogen, sulfur, boron, copper, iron, magnesium, molybdenum, and zinc.

Descriptive examples of the concentration of microelements of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 1.45% and 1.67% and all integers in between. Therefore, while these descriptive examples have, for example, 1.67%, 1.61%, 1.45%, and 1.53%, it should be understood that these descriptions are applicable to any such concentration including but not limited to ranging between 1.45% and 1.67% and all integers in between, as will be understood by one skilled in the art. In some embodiments, the term "effective amount" of microelements may indicate an amount that is effective, when administered in a composition for weed control and plant fertilization as described herein.

Nitrogen Source

Nitrogen is an important nutrient as it contributes to growth and coloring. The composition of the present disclosure may use a soy-hydrolysate, for example Agroplasma Explorer 10-0-0, which is organic and shelf-stable, a feed grade urea, or urea as a source of nitrogen.

Descriptive examples of the concentration of soy hydrolysate of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 1.88% and 2.5% and all integers in between. Therefore, while these descriptive examples have, for example, 2.5%, 2.08%, 1.88%, and 1.98%, it should be understood that these descriptions are applicable to any such concentration including but not limited to ranging between 1.88% and 2.5% and all integers in between, as will be understood by one skilled in the art. In some embodiments, the term "effective amount" of soy hydrolysate may indicate an amount that is effective, when administered in a composition for weed control and plant fertilization as described herein Natural-Based Wetting Agents As used herein, "wetting agent" means any natural-based wetting agent, soil penetrant, and non-ionic surfactant derived from *Yucca schidigera*. Wetting agents can be commercially purchased, for example YUCCAH® and Therm X-70. Both products are derived from *Yucca schidigera*, a unique desert plant that produces natural surfactant compounds to help it manage water more efficiently. These surfactant compounds help improve the spreadability and soaking effect of water, even in very dry, water resistant soils. These are safe alternatives to chemical wetting agents. Other examples of wetting agents can include non-ionic surfactants derived from plants such as *Yucca schidigera*.

Descriptive examples of the concentration of a natural-based wetting agent of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 0.34% and 0.42% and all integers in between. Therefore, while these descriptive examples have, for example, 0.41%, 0.42%, 0.34%, and 0.38%, it should be understood that these descriptions are applicable to any such concentration including but not limited to ranging between 0.34% and 0.42% and all integers in between, as will be understood by one skilled in the art. In some embodiments, the term "effective amount" of a natural-based wetting agent may indicate an amount that is effective, when administered in a composition for weed control and plant fertilization as described herein Molasses Desugarized Solubles Molasses Desugarized Solubles (MDS) is produced during the exclusion separation of sucrose from beet molasses and can be purchased commercially. In the process, sucrose is recovered for granulation and the greater part of the non-sugars of the original sugar beet molasses is separated into residual molasses and concentrated to produce MDS. Major components of MDS are water, sugar, raffinose, betaine, amino acids, nitrogen compounds, inorganic salts and organic acid salts. These all occur naturally in sugar beets. MDS is a valuable animal feed additive that has many of the properties of molasses with more protein and minerals.

Descriptive examples of the concentration of MDS of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 39.17% and 42.01% and all integers in between. Therefore, while these descriptive examples have, for example, 39.17%, 42.01%, 39.57%, and 40.79%, it should be understood that these descriptions are applicable to any such concentration including but not limited to ranging between 39.17% and 42.01% and all integers in between, as will be understood by one skilled in the art. In some embodiments, the term "effective amount" of MDS may indicate an amount that is effective, when administered in a composition for weed control and plant fertilization as described herein.

Calcium Lignin

Calcium lignin, or calcium lingosulfonate is known to have chelating or sticking properties (OMRI, 2013). It is hypothesized to aid with the delivery of the iron into the plant and therefore may reduce the impact of heat and drought on plants. Calcium lignin may be purchased commercially and is available as a liquid or powder.

Descriptive examples of the concentration of calcium lignin of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 3.24% and 3.58% and all integers in between. Therefore, while these descriptive examples have, for example, 3.33%, 3.58%, 3.24%, and 3.41%, it should be understood that these descriptions are applicable to any such concentration including but not limited to ranging between 3.24% and 3.58% and all integers in between, as will be understood by one skilled in the art. In some embodiments, the term "effective amount" of calcium lignin may indicate an amount that is effective, when administered in a composition for weed control and plant fertilization as described herein.

Glycerin

Descriptive examples of the concentration of glycerin of the formulation are shown in Table 1, Table 3, and Table 4 of the present disclosure. These percentages are based off of kilograms present in the concentrated formula. However, as will be apparent to one skilled in the art, these concentrations may encompass any percentage including but not limited to a range between 0.35% and 0.43% and all integers in between. Therefore, while these descriptive examples have, for example, 0.41%, 0.43%, 0.35%, and 0.39%, it should be understood that these descriptions are applicable to any such concentration including but not limited to ranging between 0.35% and 0.43% and all integers in between, as will be understood by one skilled in the art. In some embodiments, the term "effective amount" of glycerin may indicate an amount that is effective, when administered in a composition for weed control and plant fertilization as described herein.

Preservatives

As will be understood by one skilled in the art, the formulations of the present disclosure may further comprise a preservative to maintain the solution for several days after mixing. Examples of such preservatives include, but are not limited to, those that stabilize nitrogen. These preservatives can be commercially purchased, for example, LESCO U-PLUS®.

Mode of Application

As will be understood by one skilled in the art, once they understand the principles of the embodiments of the disclosure, the ingredients described herein for the formulation of the present disclosure may be used in a variety of preparations and applications including but not limited to injection, surface broadcast, broadcast incorporated, band application, fertigation, foliar application, sidedress, topdress, and seed placement.

Injection is used to place liquids below the soil near plant roots. It reduces losses through precise application of nutrients. Surface broadcast is method whereby fertilizer is applied across an entire field. High capacity spreaders are used to spin dry fertilizer or spray liquid fertilizer on the soil surface or on a growing crop. It is fast and economical. Broadcast incorporated improves surface application by incorporating the fertilizer through plowing or disking. Band application is also known as starter application. In the band application method, fertilzer is applied in bands near developing roots. This can be done before or during seed planting.

Fertigation is the distribution of water-soluble fertilizers through an irrigation system. Foliar application is a method whereby small amounts of fertilizer are applied by directing spraying the leaves. Sidedressing is when fertilizer is applied between rows of young plants to provide a boost during periods of growth. Topdressing is when fertilizer is spread on established fields (for example, grasses and legumes). Lastly, seed placement, also known as pop-up application is when a small amount of fertilizer is placed with seeds during planting.

EXAMPLES

The following examples are provided to illustrate further the various applications of the present composition and are not intended to limit beyond the limitations set forth in the appended claims.

Example 1

While other commercially available products may be used in the composition of the present disclosure, the natural-based wetting agent used in Tables 3-4 below was YUCCAH®, the mix of microelements used was AGROPLASMA INC® Microelements 1-0-0, and the soy hydrolysate used was AGROPLASMA INC® Explorer Liquid 10-0-0.

FIG. 1 shows an example of how the concentrated formula may be generated. As shown in FIG. 1, in step 103a the concentrate can be made by heating 1.75 gallons of water to approximately 160 degrees Fahrenheit, then in steps 103b while agitating the water mix in 2.4 pounds of borresol humate HA-1 powder. In step 103c, the mixture is allowed to cool and then the remaining ingredients, appropriate amounts of molasses desurgarized solubles, natural-based wetting agent, calcium lignosulfonate, microelements, soy hydrolysate, and HEDTA iron and the composition may also include glycerin are added. In step 105 the mixture is diluted 105 with water and then in step 107 the mixture is applied in a mode as described above.

In Table 3 below shows different amounts of the ingredients to treat from 1000 square feet to 128,000 square feet (SQ), column one. The total volume of the concentrate is shown in two units of measurement: kilograms (kg) (column 2) and ounces (oz) (column 3). Columns 4 through 11 show the amount of MDS, the amount of natural-based wetting agent (WA), the amount of soy hydrolysate (nitrogen source) (N), the amount of microelements (ME), the amount of humate (H), the amount of calcium lignin (Ca), the amount of iron, and the amount of Glycerin, respectively, in kilograms. The last row of Table 3 shows the percentage of each ingredient in the concentrated composition.

TABLE 3

| SQ | Total Volume concentrate | | MDS | WA | N | ME | H | Ca | Iron | Glycerin |
| | kg | oz | kg | kg | kg | kg | kg | kg | kg | kg |
| --- | --- | --- | --- | --- | --- | --- | --- | --- | --- | --- |
| 1000 | 1.2 | 42.33 | 0.47 | 0.005 | 0.03 | 0.02 | 0.03 | 0.04 | 0.6 | 0.005 |
| 2000 | 2.4 | 84.66 | 0.94 | 0.01 | 0.06 | 0.04 | 0.06 | 0.08 | 1.2 | 0.01 |
| 4000 | 4.8 | 169.32 | 1.88 | 0.02 | 0.12 | 0.08 | 0.12 | 0.16 | 2.4 | 0.02 |
| 8000 | 9.6 | 338.63 | 3.76 | 0.04 | 0.24 | 0.16 | 0.24 | 0.32 | 4.8 | 0.04 |
| 16000 | 19.2 | 677.26 | 7.52 | 0.08 | 0.48 | 0.32 | 0.48 | 0.64 | 9.6 | 0.08 |
| 32000 | 38.4 | 1354.52 | 15.04 | 0.16 | 0.96 | 0.64 | 0.96 | 1.28 | 19.2 | 0.16 |
| 64000 | 76.8 | 2709.04 | 30.08 | 0.32 | 1.92 | 1.28 | 1.92 | 2.56 | 38.4 | 0.32 |
| 128000 | 153.6 | 5418.08 | 60.16 | 0.64 | 3.84 | 2.56 | 3.84 | 5.12 | 76.8 | 0.64 |
| % in formula | | | 39.17% | 0.42% | 2.5% | 1.67% | 2.5% | 3.33% | 50% | 0.42% |

As shown in Table 3 above, the example composition provided herein to treat approximately 1,000 square feet comprises 0.47 kg MDS (equivalent to ~16.47 fluid ounces), 0.005 kg of a natural-based wetting agent (equivalent to 0.18 fluid ounces), 0.03 kg soy hydrolysate (N) (equivalent to ~0.9 fluid ounces), 0.02 kg microelements (equivalent to ~0.75 fluid ounces), 0.03 kg humate (equivalent to ~1.02 fluid ounces), 0.04 kg calcium lignin (equivalent to ~1.5 fluid ounces), and 0.6 kg Iron HEDTA (equivalent to ~21 fluid ounces). The composition may further comprise 0.005 kg glycerin (equivalent to ~0.18 fluid ounces). As will be understood by one skilled in the art, additional preservatives may also be added to maintain the solution for a few days. Water may be added to the concentrated composition to treat 1000 square feet at a rate of, for example, 342 ounces (for 3 gallons total) or 214 ounces (for 2 gallons total), depending on the application method. The total volume/square foot equates to between 0.3 ounces and 0.4 ounces per square foot. The final composition may be applied by any of the methods described above directly to the soil, lawn, or a cultivated area, for example, and may be modified accordingly to treat more or less square footage.

Example 2

Table 4 below shows different measurements and ranges of the ingredients for 100 kg of concentrated formula. Column 1 lists the ingredient, column 2 shows an example amount, column 3 shows an upper range and column 4 shows a lower range of each ingredient.

TABLE 4

| Ingredient in formulation | Example amount | Upper range | Lower range |
|---|---|---|---|
| Core 4.5% Iron HEDTA (contains ~26.7% Fe) | 49.58 kg | 51.69 kg | 46.74 kg |
| MDS | 40.79 kg | 42.01 kg | 39.57 kg |
| Wetting Agent | 0.38 kg | 0.42 kg | 0.34 kg |
| Glycerin | 0.39 kg | 0.43 kg | 0.35 kg |
| Humate | 1.94 kg | 2.04 kg | 1.84 kg |
| Microelements | 1.53 kg | 1.61 kg | 1.45 kg |
| Ca lignin | 3.41 kg | 3.58 kg | 3.24 kg |
| Soy hydrolysate | 1.98 kg | 2.08 kg | 1.88 kg |
| Total | 100.0 kg | | |

As shown in Table 4 above, the example composition provided herein for 100 kg of concentrate comprises an average 49.58 kg Iron HEDTA (ranging between 51.69 kg and 46.74 kg), an average 40.79 kg MDS (ranging between 42.01 kg and 39.57 kg), an average 0.38 kg of a natural-based wetting agent (ranging between 0.42 kg and 0.34 kg), an average 0.39 kg glycerin (ranging between 0.42 kg and 0.35 kg), an average 1.94 kg humate (ranging between 2.04 kg and 1.84 kg), an average 1.53 kg microelements (ranging between 1.61 kg and 1.45 kg), an average 3.41 kg calcium lignin (ranging between 3.58 kg and 3.24 kg), and an average 1.98 kg soy hydrolysate (ranging between 2.08 kg and 1.88 kg). As will be understood by one skilled in the art, the concentrated solution will be diluted to approximately between 11% and 16.5% (concentrated formula/total volume) and applied at an appropriate rate based on the square footage and mode of application, for example, between 0.2 ounces and 0.4 ounces per square foot. Additional preservatives may also be added to maintain the solution for a few days. The final composition may be applied by any of the methods described above directly to the soil, lawn, or a cultivated area, for example, and may be modified accordingly to treat more or less square footage.

Example 3

In another embodiment of the present disclosure, the application of the composition to soil and plants in accordance with the teaching of the present disclosure kills weeds as well as fertilizes plants. The composition of the present disclosure is a post emergent weed control and fertilizer made from food grade ingredients that will kill most broadleaf weeds without damaging the surrounding cultivated area. The ingredients in the composition of the present disclosure function as catalysts for oxygen reduction, which causes the production of unstable and highly reactive oxygen radicals, such as hydroxyl radicals. This causes cellular damage within the weed, leading to plant death. The weeds cannot handle the nutrient overload because they metabolize them too quickly causing them to die.

Figure 2F:
FIG. 2F is a photograph of the broad leaf weed shown in FIG. 2A 48 hours and 34 minutes after application of the formulation of the present disclosure.

Shown in FIGS. 2A-2F, application of the composition of the present disclosure was effective at killing a broadleaf weed. FIG. 2A shows the weed approximately one minute after application of the composition of the present disclosure. FIGS. 2B-2F shown the same weed at various time points after application. Weed death is evident approximately 2 days (48 hours) after application (FIG. 2F). The application of the composition of the present disclosure may be conducted in a variety of manners in order to allow the composition to kill weeds as well as fertilize surrounding plants. In the example shown in FIGS. 2A-2F, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. Other modes of application may be used, including but not limited to, injection, broadcast incorporated, band application, fertigation, foliar application, sidedress, topdress, and seed placement may be used.

Example 4

Figure 3A:
FIG. 3A is a photograph of a broad leaf weed 2 minutes after application of the formulation of the present disclosure.
Figure 3B:
FIG. 3B is a photograph of the broad leaf weed shown in FIG. 3A 18 hours and 36 minutes after application of the formulation of the present disclosure.
Figure 3C:
FIG. 3C is a photograph of the broad leaf weed shown in FIG. 3A 22 hours and 39 minutes after application of the formulation of the present disclosure.
Figure 3D:
FIG. 3D is a photograph of the broad leaf weed shown in FIG. 3A 25 hours and 54 minutes after application of the formulation of the present disclosure.
Figure 3E:
FIG. 3E is a photograph of the broad leaf weed shown in FIG. 3A 43 hours and 18 minutes after application of the formulation of the present disclosure.
Figure 3F:
FIG. 3F is a photograph of the broad leaf weed shown in FIG. 3A 47 hours and 49 minutes after application of the formulation of the present disclosure.
Figure 3G:
FIG. 3G is a photograph of the broad leaf weed shown in FIG. 3A 48 hours and 31 minutes after application of the formulation of the present disclosure.

Shown in FIGS. 3A-3F, application of the composition of the present disclosure was effective at killing a broadleaf weed while the surrounding grass remains unharmed and is fertilized by the composition. FIG. 3A shows the weed approximately two minutes after application of the composition of the present disclosure. FIGS. 3B-3G shown the same weed at various time points after application. Weed death is evident approximately 2 days (48 hours) after application (FIG. 3G). The application of the composition of the present disclosure may be conducted in a variety of manners in order to allow the composition to kill weeds as well as fertilize surrounding plants. In the example shown in FIGS. 3A-3G, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. Other modes of application may be used, including but not limited to, injection, broadcast incorporated, band application, fertigation, foliar application, sidedress, topdress, and seed placement may be used.

Example 5

Figure 4A:
FIG. 4A is a photograph of bindweed prior to application of the formulation of the present disclosure.
Figure 4B:
FIG. 4B is a photograph of the bindweed shown in FIG. 4A 24 hours after application of the formulation of the present disclosure.
Figure 4C:
FIG. 4C is a photograph of the bindweed shown in FIG. 4A 48 hours after application of the formulation of the present disclosure.
Figure 4D:
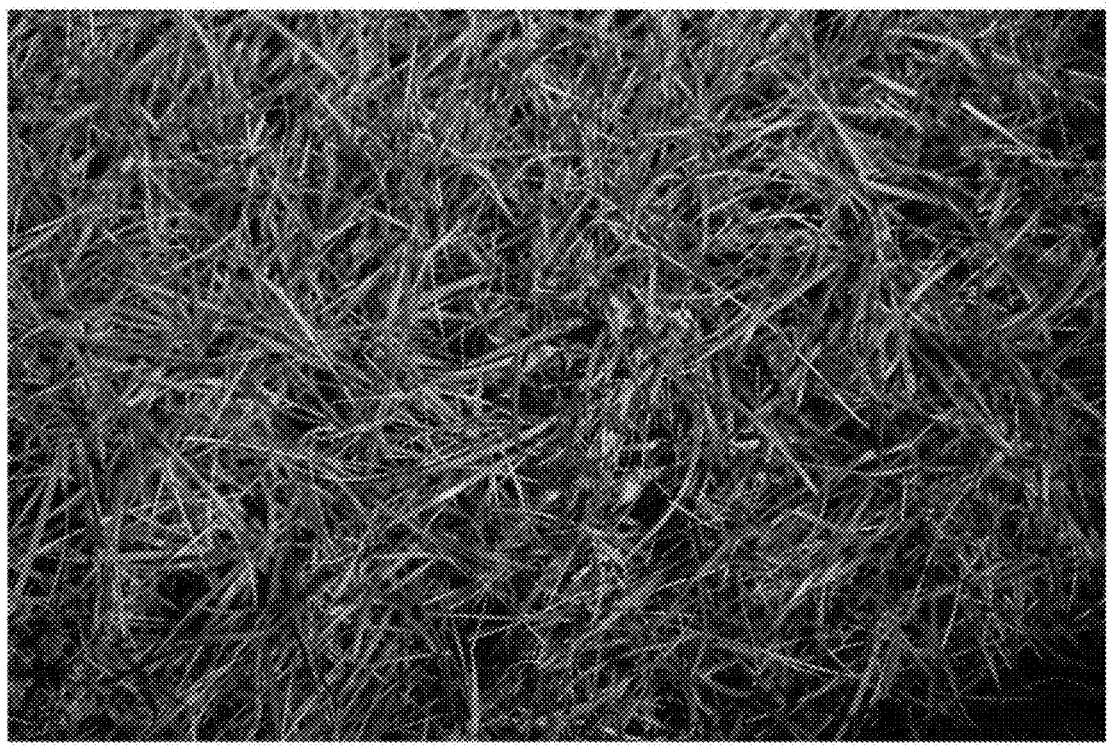
FIG. 4D is a photograph of the bindweed shown in FIG. 4A 72 hours after application of the formulation of the present disclosure.
Figure 4E:
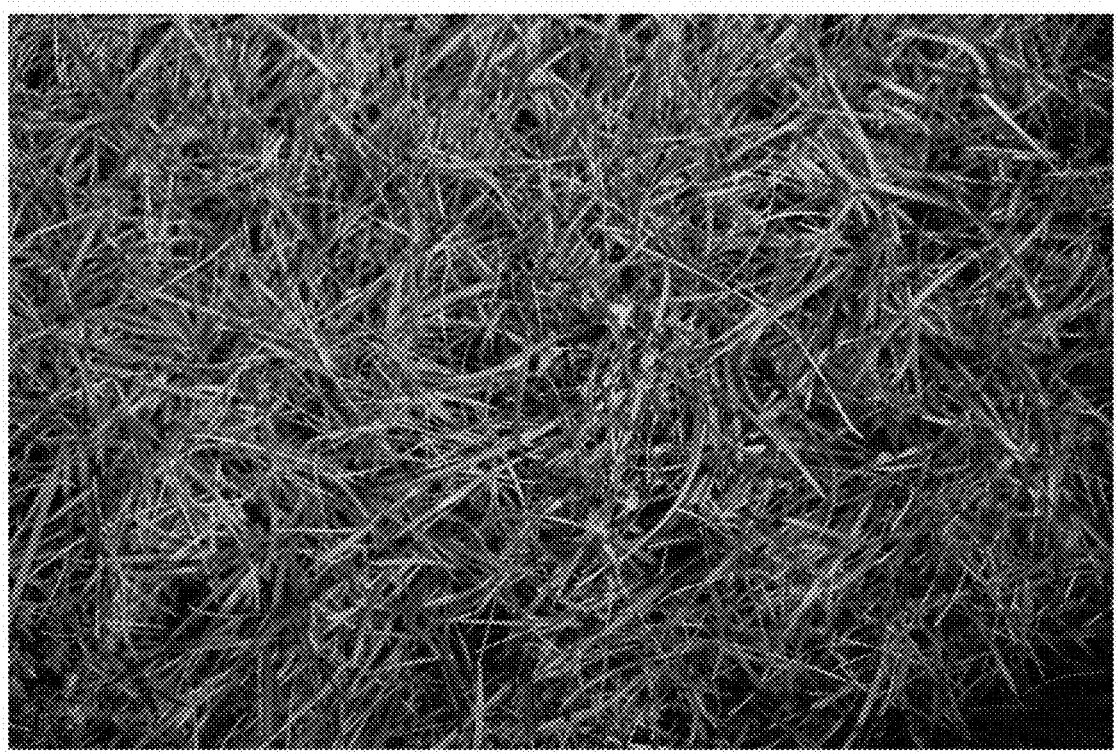
FIG. 4E is a photograph of the bindweed shown in FIG. 4A 75 hours after application of the formulation of the present disclosure.

Shown in FIGS. 4A-4E, application of the composition of the present disclosure was effective at killing bindweed while the surrounding grass remains unharmed and is fertilized by the composition. FIG. 4A shows the weed prior to application of the composition of the present disclosure. FIGS. 4B-4E shown the same weed at various time points after application. Weed death is evident approximately 24 to 72 hours after application (FIG. 4C). The application of the composition of the present disclosure may be conducted in a variety of manners in order to allow the composition to kill weeds as well as fertilize surrounding plants. In the example shown in FIGS. 4A-4E, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. Other modes of application may be used, including but not limited to, injection, broadcast incorporated, band application, fertigation, foliar application, sidedress, topdress, and seed placement may be used.

Example 6

Figure 5A:
FIG. 5A is a photograph of clover prior to application of the formulation of the present disclosure.
Figure 5B:
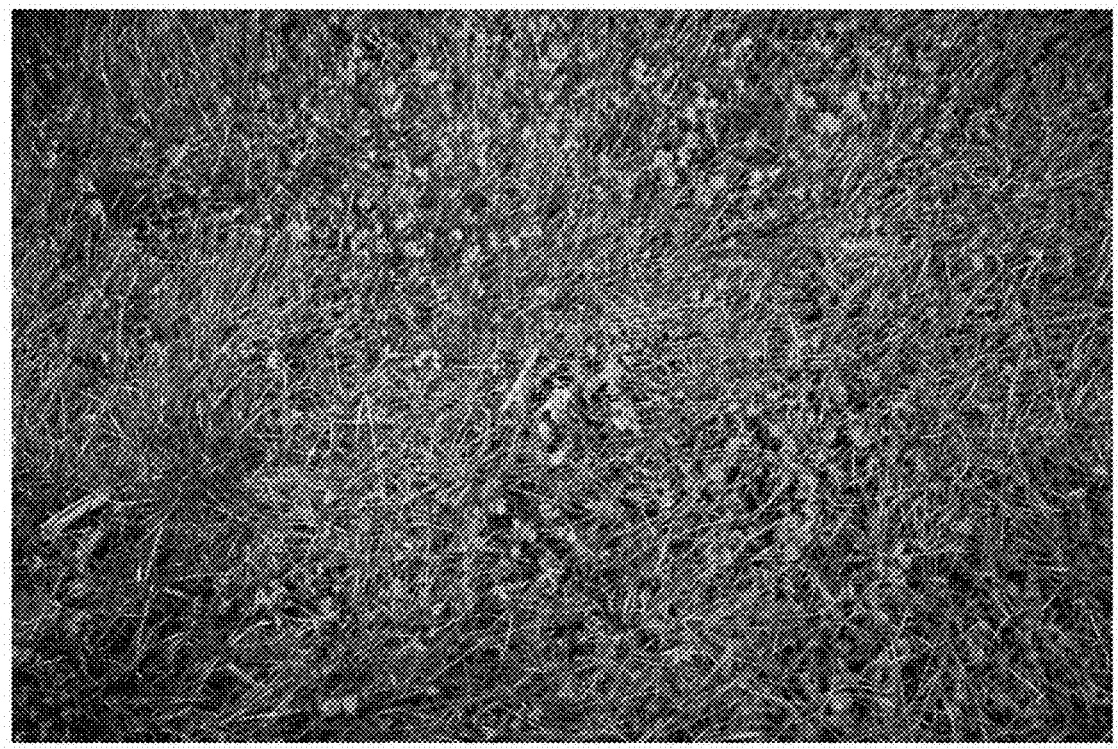
FIG. 5B is a photograph of the clover shown in FIG. 5A 22 hours after application of the formulation of the present disclosure.
Figure 5C:
FIG. 5C is a photograph of the clover shown in FIG. 5A 46 hours after application of the formulation of the present disclosure.
Figure 5D:
FIG. 5D is a photograph of the clover shown in FIG. 5A 68 hours after application of the formulation of the present disclosure.
Figure 5E:
FIG. 5E is a photograph of the clover shown in FIG. 5A 90 hours after application of the formulation of the present disclosure.
Figure 5F:
FIG. 5F is a photograph of the clover shown in FIG. 5A 116 hours after application of the formulation of the present disclosure.
Figure 5G:
FIG. 5G is a photograph of the clover shown in FIG. 5A 136 hours after application of the formulation of the present disclosure.
Figure 5H:
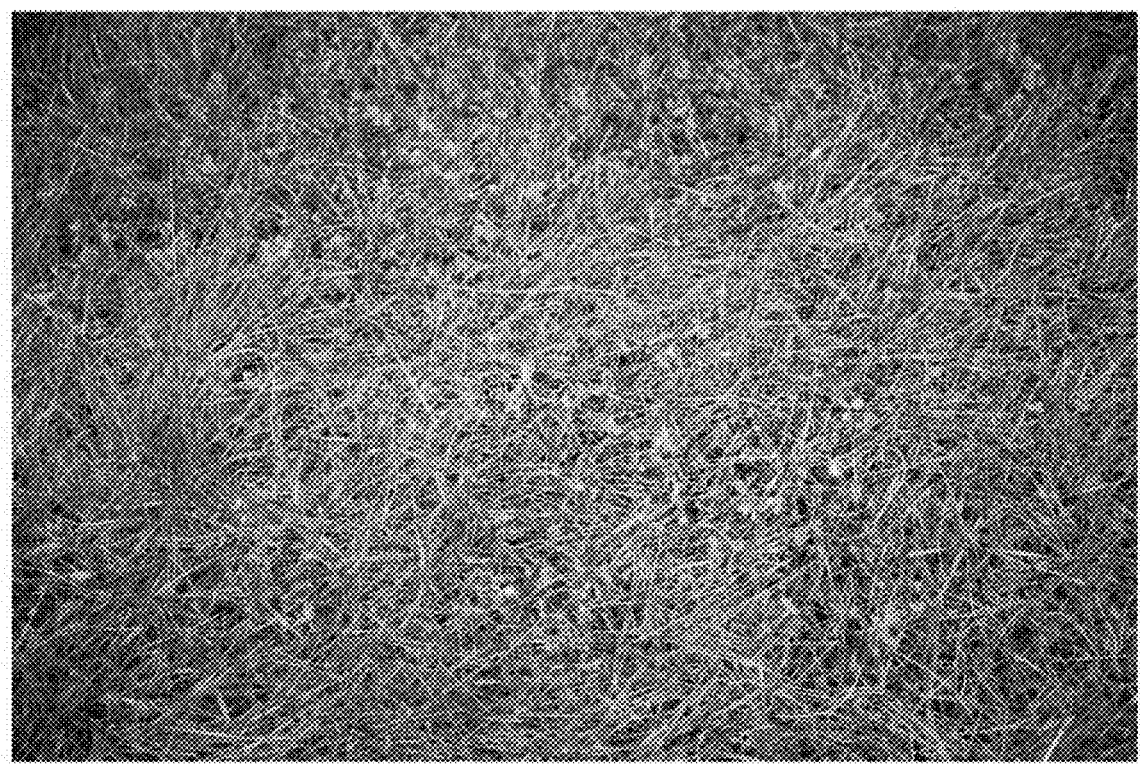
FIG. 5H is a photograph of the clover shown in FIG. 5A 142 hours after application of the formulation of the present disclosure.

Shown in FIGS. 5A-5H, application of the composition of the present disclosure was effective at killing clover while the surrounding grass remains unharmed and is fertilized by the composition. FIG. 5A shows the weed prior to application of the composition of the present disclosure. FIGS. 5B-5H shown the same weed at various time points after application. For difficult weeds such as clover, a second application may be applied 7 to 10 days later. The application of the composition of the present disclosure may be conducted in a variety of manners in order to allow the composition to kill weeds as well as fertilize surrounding plants. In the example shown in FIGS. 5A-5H, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. Other modes of application may be used, including but not limited to, injection, broadcast incorporated, band application, fertigation, foliar application, sidedress, topdress, and seed placement may be used.

Example 7

Figure 6A:
FIG. 6A is a photograph of wild strawberry prior to application of the formulation of the present disclosure.
Figure 6B:
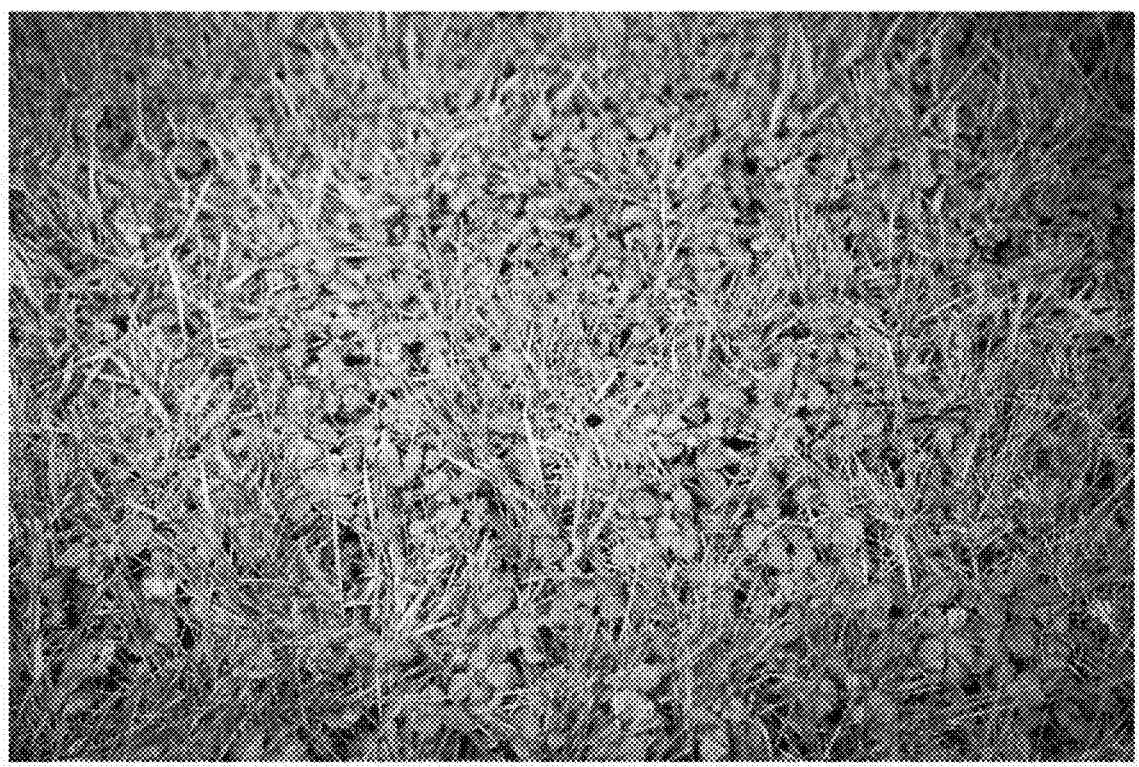
FIG. 6B is a photograph of the wild strawberry shown in FIG. 6A 26 hours after application of the formulation of the present disclosure.
Figure 6C:
FIG. 6C is a photograph of the wild strawberry shown in FIG. 6A 50 hours after application of the formulation of the present disclosure.
Figure 6D:
FIG. 6D is a photograph of the wild strawberry shown in FIG. 6A 59 hours after application of the formulation of the present disclosure.
Figure 6E:
FIG. 6E is a photograph of the wild strawberry shown in FIG. 6A 72 hours after application of the formulation of the present disclosure.
Figure 6F:
FIG. 6F is a photograph of the wild strawberry shown in FIG. 6A 84 hours after application of the formulation of the present disclosure.
Figure 6G:
FIG. 6G is a photograph of the wild strawberry shown in FIG. 6A 96 hours after application of the formulation of the present disclosure.
Figure 6H:
FIG. 6H is a photograph of the wild strawberry shown in FIG. 6A 108 hours after application of the formulation of the present disclosure.
Figure 6I:
FIG. 6I is a photograph of the wild strawberry shown in FIG. 6A 120 hours after application of the formulation of the present disclosure.

Shown in FIGS. 6A-6I, application of the composition of the present disclosure was effective at killing wild strawberry while the surrounding grass remains unharmed and is fertilized by the composition. FIG. 6A shows the weed prior to application of the composition of the present disclosure. FIGS. 6B-6I shown the same weed at various time points after application. For difficult weeds such as wild strawberry, a second application may be applied 7 to 10 days later. The application of the composition of the present disclosure may be conducted in a variety of manners in order to allow the composition to kill weeds as well as fertilize surrounding plants. In the example shown in FIGS. 6A-6I, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. Other modes of application may be used, including but not limited to, injection, broadcast incorporated, band application, fertigation, foliar application, sidedress, topdress, and seed placement may be used.

Example 8

Figure 7:
FIG. 7 is a photograph of an untreated (left) and treated (right) lawn after one year.

Shown in FIG. 7 is a comparison between two lawns, one untreated (left side), the other (right side) treated with the composition of the present disclosure for one year. As shown in FIG. 7, the lawn treated with the composition of the present disclosure is primarily free of weeds and healthier than the untreated lawn. The application of the composition of the present disclosure may be conducted in a variety of manners in order to allow the composition to kill weeds as well as fertilize surrounding plants. In the example shown in FIG. 7, the composition of the present disclosure was applied evenly over the entire lawn area (blanket application, also known as surface broadcast) using a spray tank with a 2-gallon per minute cone gun nozzle. The composition was applied at a rate of 3 gallons per 1000 square feet. (approximately 2 years worth of treatments which is 3-4 applications per year). Other modes of application may be used, including but not limited to, injection, broadcast incorporated, band application, fertigation, foliar application, sidedress, topdress, and seed placement may be used.

The foregoing description has been presented for purposes of illustration and description. It is not intended to be exhaustive or to limit the disclosures to the precise form disclosed, and other modifications and variations may be possible in light of the above teachings. The embodiments were chosen and described in order to best explain the principles and its practical application to thereby enable others skilled in the art to best utilize the disclosure in various embodiments and various modifications as are suited to the particular use contemplated. It is intended that the appended claims be construed to include other alternative embodiments except insofar as limited by the prior art.

What is claimed is:

1. A method for broadleaf weed control and fertilization comprising the steps of:
    providing a concentrated liquid composition comprising:
        iron hydroxyl ethylenediaminetriacetic acid, at between 46.74% and 51.69% of the total weight;
        humate, at approximately between 1.84% and 2.5% of the total weight;
        microelements, at approximately between 1.45% and 1.67% of the total weight;
        soy hydrolysate, at approximately between 1.88% and 2.5% of the total weight;
        a wetting agent, at approximately between 0.34% and 0.42% of the total weight;
        molasses desugarized solubles, at approximately between 39.17% and 42.01% of the total weight; and
        calcium lignin, at approximately between 3.24% and 3.58% of the total weight;
    diluting said concentrated liquid composition to between 11% and 16.5% of concentrated formula volume over total volume; and
    applying an effective amount of the diluted composition to soil, lawn, or cultivated area, wherein said effective amount is between 0.2 ounces and 0.4 ounces per square foot.

2. The method of claim 1, wherein said composition concentrated further comprises glycerin at approximately between 0.35% and 0.43% of the total weight.

3. The method of claim 1, wherein said composition concentrated further comprises a preservative.

4. The method of claim 1, wherein said diluted composition is applied to said soil, lawn, or cultivated area by one or more of the following methods: injection, surface broadcast, broadcast incorporated, band application, fertigation, foliar application, sidedress, topdress, and seed placement.

5. The method of claim 1, further comprising the step of:
    applying at least a second application of said effective amount of the diluted composition to said soil, lawn, or cultivated area.

6. The method of claim 5, wherein said concentrated composition further comprises glycerin at approximately between 0.35% and 0.43% of the total weight.

7. The method of claim 5, wherein said concentrated composition further comprises a preservative.

8. The method of claim 5, wherein said diluted composition is applied to said soil, lawn, or cultivated area by one or more of the following methods: injection, surface broadcast, broadcast incorporated, band application, fertigation, foliar application, sidedress, topdress, and seed placement.

9. The method of claim 5, wherein the broadleaf weed is selected from bindweed, black medic, broadleaf plantain, bull thistle, Canada thistle, common chickweed, dandelion, false dandelion, lambs ear, mallow, narrow-leaved plantain, oxalis, Persian speedwell, prickly lettuce, prostrate spurge, purslane, redroot pigweed, slender speedwell, white clover, wild strawberry, wild violet, and combinations thereof.

10. The method of claim 5, wherein the method kills at least 25% of said broadleaf weed.

11. The method of claim 5, wherein the method kills at least 50% of said broadleaf weed.

12. The method of claim 5, wherein the method kills at least 60% of said broadleaf weed.

13. The method of claim 5, wherein the method kills at least 70% of said broadleaf weed.

14. The method of claim 5, wherein the method kills at least 80% of said broadleaf weed.

15. The method of claim 5, wherein the method kills at least 90% of said broadleaf weed.

16. The method of claim 5, wherein broadleaf weed is dandelion, and the method kills greater than 90% of said dandelion.

\* \* \* \* \*

UNITED STATES PATENT AND TRADEMARK OFFICE
CERTIFICATE OF CORRECTION

PATENT NO. : 11,968,977 B2
APPLICATION NO. : 17/739667
DATED : April 30, 2024
INVENTOR(S) : Bradley T. Wolfe It is certified that error appears in the above-identified patent and that said Letters Patent is hereby corrected as shown below:

In the Claims

At Column 14, Claim number 2, Line number 51, reads:
"The method of claim 1, wherein said composition concentrated further comprises glycerin at approximately between 0.35% and 0.43% of the total weight."
Should read:
-- The method of claim 1, wherein said concentrated composition further comprises glycerin at approximately between 0.35% and 0.43% of the total weight. --

At Column 14, Claim number 3, Line number 54, reads:
"The method of claim 1, wherein said composition concentrated further comprises a preservative."
Should read:
-- The method of claim 1, wherein said concentrated composition further comprises a preservative. --

At Column 15, Claim number 10, Line number 15, reads:
"The method of claim 5, wherein the method kills at least 25% of said broadleaf weed."
Should read:
-- The method of claim 1, wherein the method kills at least 25% of said broadleaf weed. --

At Column 15, Claim number 11, Line number 17, reads:
"The method of claim 5, wherein the method kills at least 50% of said broadleaf weed."
Should read:
-- The method of claim 1, wherein the method kills at least 50% of said broadleaf weed. --

At Column 15, Claim number 12, Line number 19, reads:
"The method of claim 5, wherein the method kills at least 60% of said broadleaf weed."
Should read:
-- The method of claim 1, wherein the method kills at least 60% of said broadleaf weed. --

Signed and Sealed this
Eighteenth Day of June, 2024

Katherine Kelly Vidal
*Director of the United States Patent and Trademark Office*

CERTIFICATE OF CORRECTION (continued)
U.S. Pat. No. 11,968,977 B2

At Column 15, Claim number 13, Line number 21, reads:
"The method of claim 5, wherein the method kills at least 70% of said broadleaf weed."
Should read:
-- The method of claim 1, wherein the method kills at least 70% of said broadleaf weed. --

At Column 15, Claim number 14, Line number 23, reads:
"The method of claim 5, wherein the method kills at least 80% of said broadleaf weed."
Should read:
-- The method of claim 1, wherein the method kills at least 80% of said broadleaf weed. --

At Column 15, Claim number 15, Line number 25, reads:
"The method of claim 5, wherein the method kills at least 90% of said broadleaf weed."
Should read:
-- The method of claim 1, wherein the method kills at least 90% of said broadleaf weed. --

At Column 15, Claim number 16, Line number 27, reads:
"The method of claim 5, wherein broadleaf weed is dandelion, and the method kills greater than 90% of said dandelion."
Should read:
-- The method of claim 1, wherein broadleaf weed is dandelion, and the method kills greater than 90% of said dandelion. --